March 27, 1962 J. R. DINNING 3,026,971
MOTOR GENERATOR SET START CONTROL
Filed Jan. 20, 1959 5 Sheets-Sheet 1
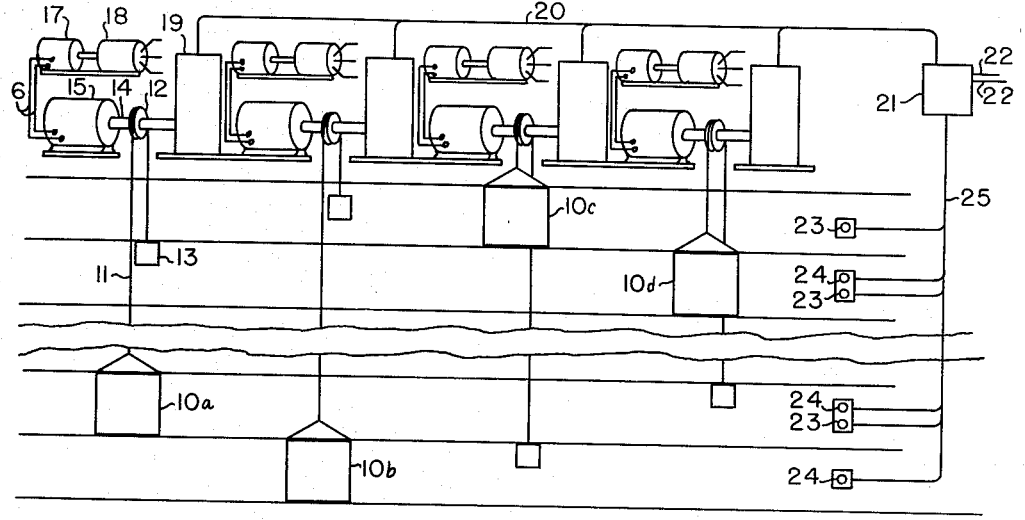
Fig-I
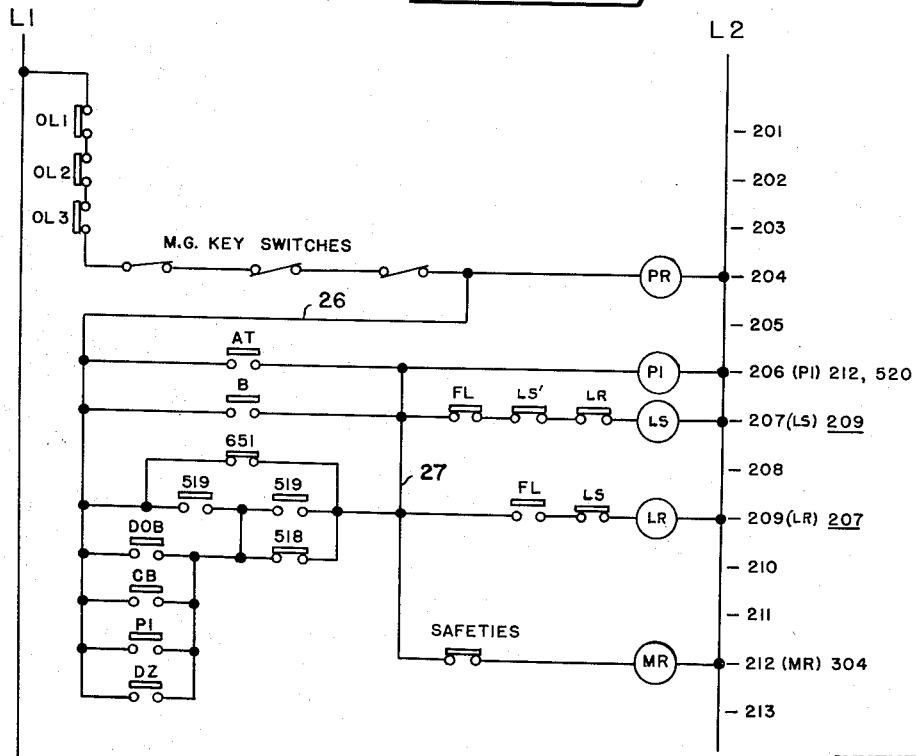
Fig-II
INVENTOR.
JOHN R. DINNING
BY
Marshall, Marshall & Yeasting
ATTORNEYS

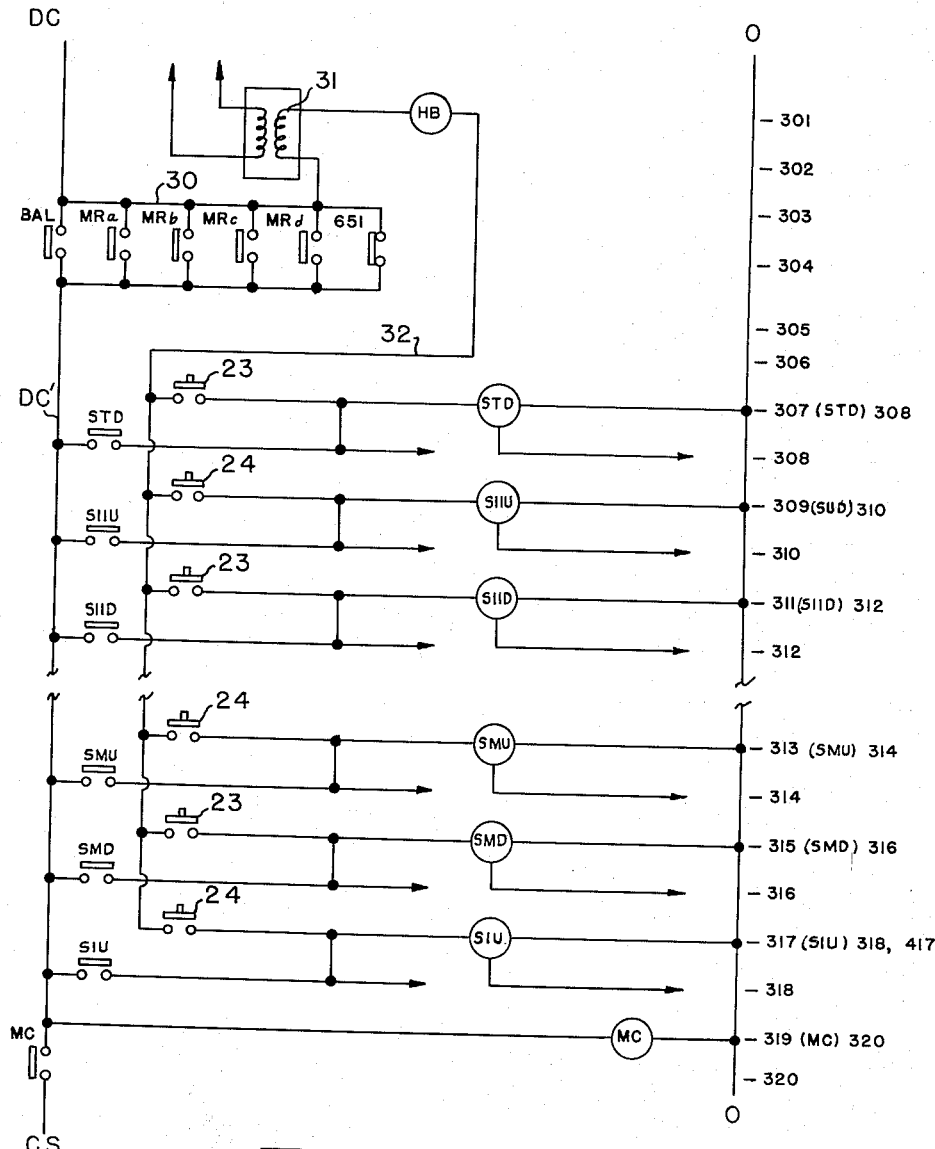
Fig. III

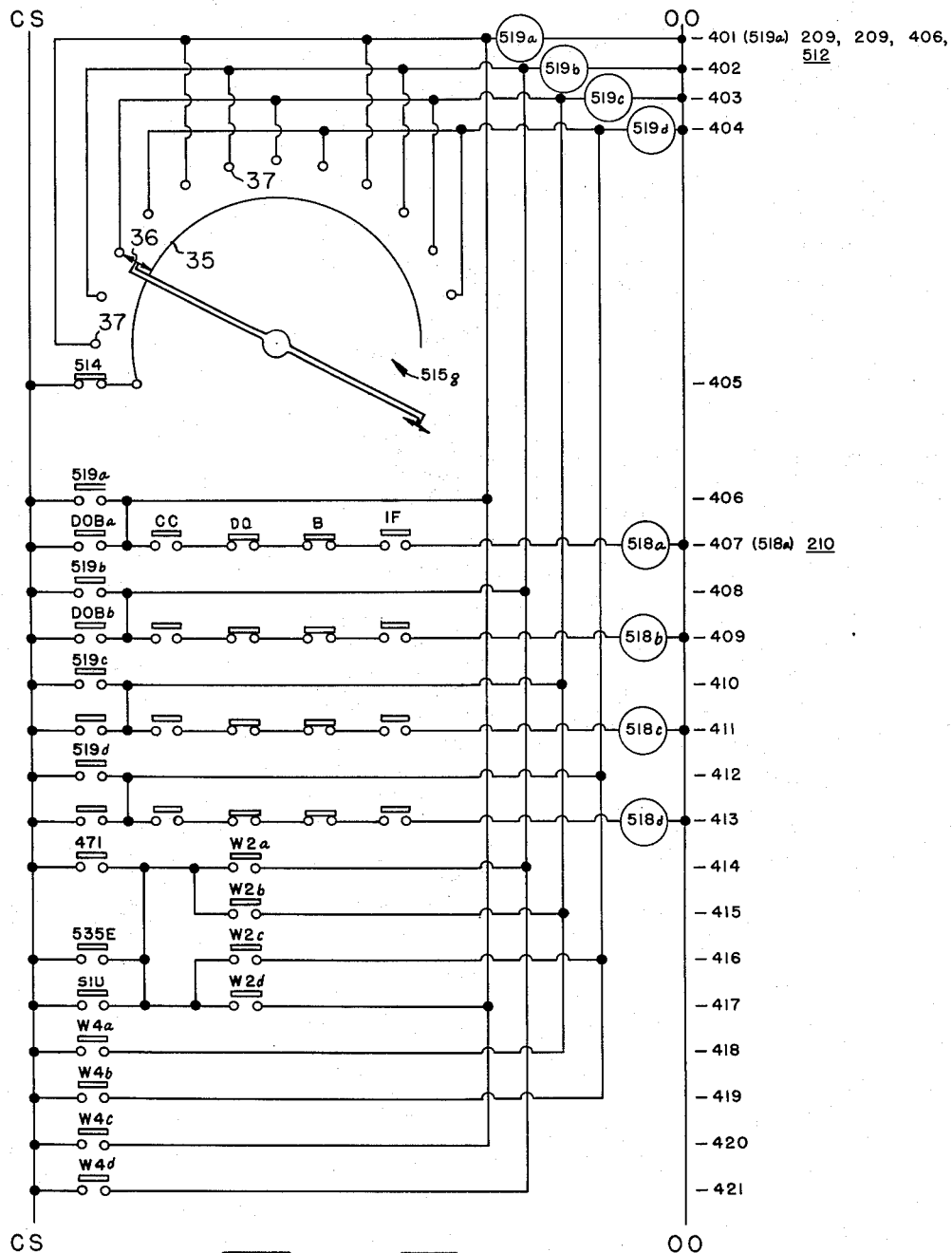
Fig. IV

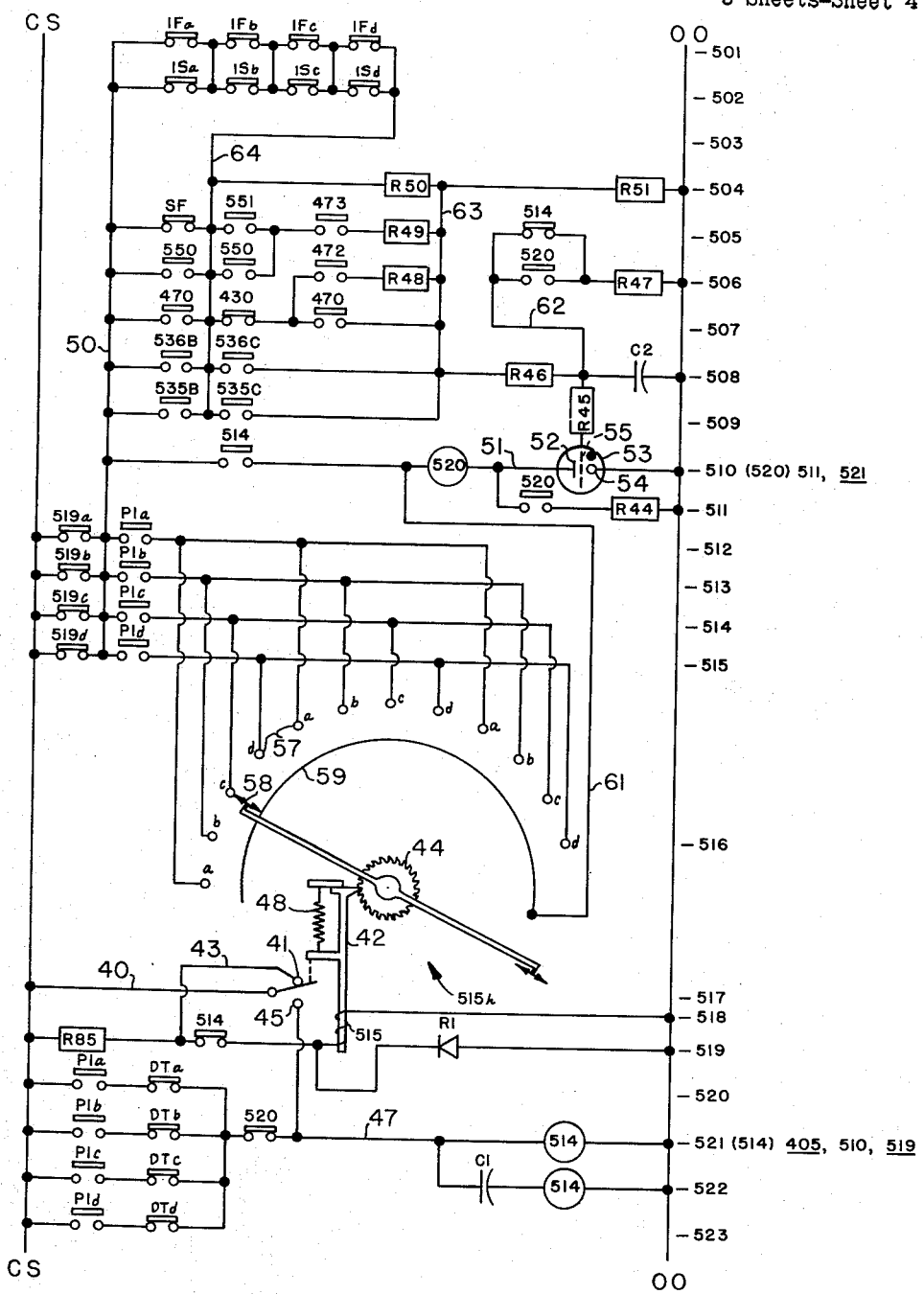

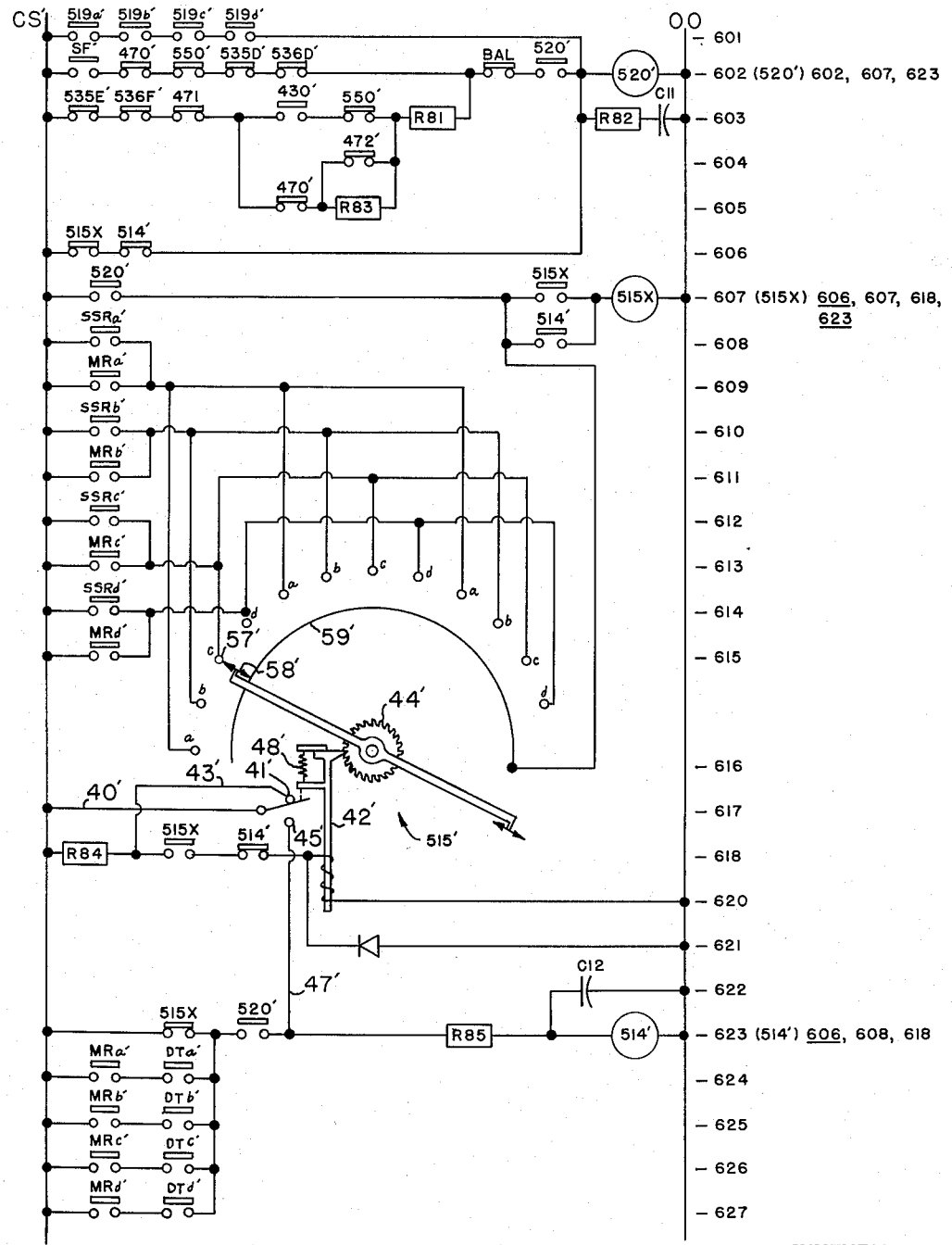
Fig. VI

United States Patent Office

3,026,971
Patented Mar. 27, 1962

3,026,971
MOTOR GENERATOR SET START CONTROL
John R. Dinning, Los Angeles, Calif., assignor to Toledo Scale Corporation, Toledo, Ohio, a corporation of Ohio
Filed Jan. 20, 1959, Ser. No. 787,936
17 Claims. (Cl. 187—29)

This invention relates to automatic elevator systems and in particular to automatic control means for starting idle motor generator sets to place more elevator cars in service according to increases in the demand for service.

Many elevator systems are designed to operate without the immediate attention of supervisors or car attendants. In such a multi-car elevator system it is desirable to vary the number of cars in service with the traffic demand and this is ordinarily done by shutting down motor generator sets of the individual elevators whenever the traffic demand is low and there are no calls requiring travel of the particular car selected as the next about to be taken from service. When some or all of the elevators have been taken from service because of the lack of demand for service and there is a demand for service or an increase over an intermittent or light demand it is desirable that only enough of the cars be brought into service to meet the demand and that the remainder of the cars remain idle.

The principal object of this invention is to provide an automatic selector control that is responsive to the demands for service and in response to such demands starts one or more of the elevator motor generator sets to bring only a sufficient number of cars into service to meet the traffic demands then registered.

Another object of the invention is to provide a selector mechanism that serves to immediately start at least one motor generator set in response to an initial demand for service and to start additional motor generator sets at timed intervals following increased demands for service.

A still further object of the invention is to provide a motor generator set starting control that is responsive to the loading in certain of the cars to start the motor generator sets of other cars to bring them into service.

A still further object of the invention is to provide a motor generator set starting selector with timing means that provides variable intervals of time between the starting of individual motor generator sets in accordance with the demand for service.

More specific objects and advantages are apparent from the following description of a preferred form of the invention.

According to the invention a selector switch or stepping switch or its equivalent is arranged with traffic or service demand sensing means so that upon an increase in traffic demand the selector switch steps to a position indicating an idle car and, according to the traffic demand, either starts the motor generator set of such a car immediately or after a time delay depending upon the traffic conditions. The traffic sensing mechanism may be sensitive to the load in the car, the demand for service as indicated by number of registered calls, interference by passengers with normal operation of the cars, or any combination of such conditions.

A preferred embodiment of the invention and one alternative circuit are illustrated in the accompanying drawings.

In the drawings:

FIG. I is a diagrammatic illustration of a plurality of elevators with control mechanism that may be operated according to the invention.

FIG. II is a schematic wiring diagram illustrating the start controlling circuits for the motor generator set of an individual elevator car.

FIG. III is a fragmentary schematic wiring diagram of hall call registering means that cooperate with the selector to indicate demands for service.

FIG. IV is a schematic wiring diagram illustrating the portion of the motor generator set starting selector control for energizing the starting relays of a selected car.

FIG. V is a schematic wiring diagram illustrating the control of the selector mechanism for selecting the motor generator sets to be started and the time at which they shall be started in accordance with the traffic demands.

FIG. VI illustrates an alternative circuit to that shown in FIG. V for operating the selector mechanism in accordance with the traffic demands.

These specific figures and the accompanying description are intended merely to illustrate the invention and not to impose limitations on its scope.

As shown in FIG. I a plurality of elevator cars 10a, 10b, 10c and 10d are suspended by cables 11 that are carried over sheaves 12 and connected to counterweights 13. The counterweights 13 are weighted to counterbalance the weight of an empty car plus approximately 40 percent of the net full load capacity of the car and thus counterbalance the car with an average load. The sheave 12 is ordinarily mounted on an armature shaft 14 of a direct current hoisting motor 15. The motor 15 is preferably a variable speed direct current motor that has its armature energized through leads 16 from a variable voltage generator 17 that is mechanically driven by a three phase A.C. motor 18. The motor and generator 18 and 17 are customarily referred to as a motor-generator set.

A floor selector machine 19, one for each of the elevators, is preferably driven from the armature shaft 14 of the hoisting motor 15 and serves to commutate or switch the various control circuits as are required for automatic operation of the elevator in response to demands for service and to control the movement of the car in responding to such demands. When the floor selector machine 19 is driven from the motor shaft 14 suitable compensating devices must be included to maintain synchronism between the floor selector machine moving members and the position of the car 10. Alternatively the floor selector machine 19 may be driven by a tape or a cable directly from the car 10.

The several floor selector machines 19 are connected through a control cable 20 to a control panel 21 that is energized through power leads 22 and that serves to correlate the operation of the elevators with the demands for service.

Demands for service may be registered from the various flors served by the cars by means of push buttons 23 for down calls and push buttons 24 for up calls. The push buttons are connected through a cable 25 to the control panel 21. Similar push buttons, not shown, are installed in the cars and connected to the control panel for registering destination calls, i.e. calls for floors to which the passengers in the car desire to be taken.

Only a few of the many circuits employed in the control of the system of elevators are shown in the drawings. Of these the control circuits relating directly to the control of the stopping and starting of the motor-generator sets are illustrated.

In the following description reference is made to a few of the many relays that are employed in the control of the elevator system. Those relays that are directly related to the motor-generator set selection for starting and stopping and are duplicated for each of the cars are:

Relays Duplicated for Each Car

| | |
|---|---|
| AT * | Attendant Control Throwover. |
| B * | Brake Relay. |
| CB * | Car Button Relay. |
| CC * | Car Call Relay. |
| DO * | Door Open. |
| DOB * | Door Open Button Relay. |
| DT | Door Interference Time Relay. |
| DZ * | Door Reopen Relay. |
| FL * | Low Motor Field Current Relay. |
| IS | In Service Relay. |
| LR | Motor Generator Run Relay. |
| LS | Motor Generator Start Relay. |
| MR | Motor Generator Control Relay. |
| OL * | Overload Relay. |
| PI | Position Indicator Relay. |
| PR | Potential Relay. |
| SSR | Special Service Relay. |
| W-2 * | 40% Load Relay. |
| W-4 * | 80% Load Relay. |
| 1F * | First Floor Relay. |
| 518 | Motor Generator Shutdown Initiation Relay. |
| 519 | Motor Generator Start Control Relay. |

* Operating coils not shown.

Other relays that are included in the supervisory control system and which are thus common to all of the cars are:

Relays Common to All Cars

| | |
|---|---|
| BAL * | Balanced Traffic Relay. |
| HB | Hall Button Relay. |
| MC | Master Control Relay. |
| S1D–S11D | Down Hall Call Relays. |
| S1U–S11U | Up Hall Call Relays. |
| SF * | Signal Circuit Failure Relay. |
| 430 * | Call Indication Relay. |
| 470 * | No Car In Service. |
| 471 * | One Car In Service. |
| 472 * | Two Cars In Service. |
| 473 * | Three Cars In Service. |
| 514 | Motor Generator Set Selector Control. |
| 515 | Motor Generator Set Selector. |
| 515 * | Auxiliary Selector Control Relay. |
| 520 | Motor Generator Set Selector Timer. |
| 535 * | Up Traffic Totalizing Relays. |
| 536 * | Down Traffic Totalizing Relays. |
| 550 * | No Car At Lower Terminal. |
| 551 * | One Car At Lower Terminal. |
| 651 * | Emergency Motor Generator Set Start Control. |

* Operating coils not shown.

FIG. II

The relays individual to each car relating directly to the starting of its motor generator set include the potential relay PR, shown in line 204, which is energized from alternating current supply leads L1 and L2 as long as no overload exists, as is indicated by closure of normally closed overload contacts OL in lines 201, 202 and 203 and as long as none of the motor generator set key switches is not opened as indicated by the closure of the key switch contacts indicated in line 204. The potential relay, when energized, indicates that alternating current power is available for operation of the car. Interruption of this circuit, by dropping out the potential relay, thus conditions all of the supervisory control circuits to indicate that the car is not available for operation.

The motor generator set of an elevator may be started by first energizing its motor generator set start relay LS, line 207, and then as soon as the motor generator set is approximately up to full operating speed deenergizing the start relay LS and energizing the run relay LR shown in line 209. If the system is to be operated with attendants contacts AT of the attendant control throwever relay, line 206, are closed so that current may flow from a lead 26 energized through the overload relay contacts OL and the motor generator set key switches to a branch lead 27. A position indicator relay coil P1, line 206, and a motor control relay coil MR, line 212, are energized from the branch lead 27. The start relay LS and run relay LR are also energized from this branch lead 27 through contacts of a weak motor field current relay FL the coil of which is connected in series with the motor shunt field.

Current for the shunt field for the direct current hoist motor 15 is supplied directly from an exciter generator, forming part of the motor generator asembly, through the operating coil FL of the low field current relay FL. Among other functions the low motor field current relay FL serves to prevent operation or attempted operation of the elevator when there is insufficient field current in the hoist motor. This weak field relay is also used in the starting sequence to drop out the start relay LS and pick up the run relay LR when the motor generator set has come up to speed. Thus with the motor generator set stopped the weak field relay FL closes its contacts FL, line 207, and opens its contacts in line 209 so that energization of the lead 27 permits current to flow from such lead through the low field current relay contacts FL in line 207, the starting relay contacts for a second car LS', and normally closed run relay contacts LR to the operating coil of the start relay LS, line 207.

The start relay is arranged in conventional circuits, not shown, to connect the drive motor 18 of the motor generator set to a 3 phase alternating current power line in Y connection thus providing starting current to the motor. As soon as the motor generator set comes up to speed in response to the operation of the startting relay LS its exciter generator current flows through the low field current relay coil and the shunt field of the hoisting motor 15 so that the low field current relay FL opens its contacts in line 207 to deenergize the start relay LS and at the same time closes its contacts FL in line 209 so that, as soon as the start relay drops out to close its contacts LS in line 209, a circuit is completed from lead 27 through the operating coil LR of the run relay LR. The run relay LR immediately connects the drive motor 18 to the alternating current power line in delta connection thus providing full voltage for normal operation.

Whenever the lead 27 is supplied with power and all of the safety circuits indicating that the elevator is in condition for safe operation are closed current may also flow from the lead 27 through an operating coil of the motor relay MR shown at line 212. The motor relay serves to connect circuits to permit energization of the shunt field of the generator 17 and thus provide operation of the elevator. As long as power is applied to the lead 27 the position indicator relay P1 shown at line 206 is energized, this relay serving to close contacts in various circuits including the circuit for indicating the position of the car along its path of travel and for indicating, in the control circuits, that the car is in condition for operation.

When the car is operating without an attendant, i.e., in automatic operation, the attendant throwover contacts AT in line 206 are open and the start and run relays can be energized only through the array of contacts illustrated in lines 208 to 213 inclusive. As indicated, the lead 27 may be energized from the lead 26 as long as the car is not selected for shutdown which is indicated by a closure of normally closed contacts 518 in line 210 and either the door open button in the car is pressed to close contacts DOB in line 210 or a car button is pressed to register a destination call thus closing car button contacts in line 211 or the position indicator relay is energized to close a sealing contact P1 in line 212 or door reopening relay is energized to close its contacts DZ in line 213. The generator shutdown initiating relay 518 is arranged, by means of circuits not shown, to be energized whenever the car is standing at the first floor or lower terminal with its doors closed, its brake on, and no car calls registered. If this condition is maintained for a given time interval motor generator set start control relay 519 having contacts shown in line 209 is tripped so as to then break the circuit from the lead 26 to the lead 27.

On automatic operation the motor generator set is started by closure of the contacts of the motor generator set start control relay 519 shown in line 209 so as to energize the lead 27 and permit the starting sequence to occur. This relay is equipped with two coils the first of which energizes the relay to close its sealing contact and the second of which is a neutralizing coil arranged to neutralize the effect of the first coil and permit the relay to release.

The motor generator set may also be started by closure of normally closed emergency start relay contacts 651 shown in line 208. The emergency start relay is normally energized as long as the operating conditions are normal to prevent starting operation in this manner. However, upon failure of the signal circuits, which would normally be employed to indicate the necessity of starting additional cars into operation, the emergency start relay, being energized from the signal control circuits, drops out and by closing its contacts as in line 208 starts the motor generator set of each elevator. Thus a failure of supervisory control circuits, whose operation is not required for the safety of operation of the elevators but merely for efficient scheduling and correlation of the operation of the several cars, does not result in loss of elevator service but rather permits all of the cars to operate independently of each other and satisfy the demands for service.

Referring again to the array of contacts in lines 209 to 213 it may be noted that motor generator start control relay contacts 519 are in parallel with the normally closed motor generator shutdown initiating relay contacts 518. This is primarily a safety measure in correlating the shutdown of the motor generator set to provide that in the event a person is in the elevator car when it closes its doors at the first floor and such person does not register a destination call within the shutdown timing interval that he may nevertheless be able to restart the motor generator set by registering the call or pressing the door open button at any later time. This is possilbe because the contacts of the motor generator shutdown initiating relay 518 remain open only briefly during the shutdown and reclose as soon as the generator set is deenergized. Therefore, this circuit may be completed to start the motor generator set at that time.

Attention may also be called to the starting relay contacts LS' shown in line 207 in series with the operating coil of the start relay. The starting relay contacts LS' are contacts of the starting relay of another car of the group and are included in the several starting circuits for the several cars so that no more than half of the cars may have their motor generator sets started simultaneously.

When the system is operating normally on automatic operation and service demands are reduced to the point that the cars may be taken from service such cars after returning to the first floor, discharging their load if any, and reclosing their doors are taken out of service by deenergizing their motor generator sets. If there is no demand for service for a substantial time interval all of the cars accumulate at the first or lobby floor with their motor generator sets shut down. Under this situation the only calls for service that may be registered are hall calls which may originate from any of the various floors served by the cars.

FIG. III

An illustrated portion of the hall call registering circuits are illustrated in FIG. III. These circuits are energized from a direct current supply bus DC+ by way of normally open contacts BAL, line 305, of a balanced traffic relay, or normally open contacts MR of a motor control relay MR of any of the elevator cars that may be operating, or by way of normally closed contacts 651, line 305, of an emergency start relay. Of these contacts the balanced traffic relay contacts are closed only when the system is conditioned for balanced up and down traffic which is an average condition with all cars operating and serving a moderate amount of traffic in each direction. Relay contacts MR$a$ for car A, MR$b$, for car B, etc., are closed only while the cars have their motor generator sets running or in the process of starting. Normally closed emergency relay contacts 651 are held open as long as control power is available for normal operation but close as soon as such control power is lost thus permitting, in an emergency, all of the cars to be brought into operation even though there may be no actual demands for service. When any of these just mentioned contacts are closed current may flow from the positive direct current lead DC+ to a control lead DC' to energize a master control relay MC which is shown at line 319. This relay immediately closes its contacts to complete a circuit from the direct current positive lead DC' to a control power supply lead CS which energizes the supervisory control circuits including those circuits for starting and stopping a motor generator set according to demand.

In normal automatic operation with no calls for service all of the parallel contacts illustrated in line 305 are open so that the DC' power supply lead is deenergized as well as the control circuits supplied from the lead CS. Assuming that an intending passenger at the 11th floor desiring down service presses a down hall call button 23 at the 11th floor current flows from the direct positive current bus DC+ through a lead 30, line 304, a low voltage secondary winding 31 of a small transformer, an operating coil of a hall button relay, line 301, to a lead 32 serving as a supply bus to which each of the hall buttons 23 or 24 is connected. Since the intending passenger has pushed the down hall button 23 for the 11th floor shown in line 311 current may flow from the lead 32 through the circuit in line 311 to energize a down hall call relay S11D. This relay then closes its sealing contacts S11D, line 312, to energize the DC' power lead (the contacts in line 304 are all still open) and thus energize the master control relay MC and the control supply lead CS. Through circuits to be described the motor relay MR shown in line 212 for the selected car is then immediately energized to close its contacts in line 304 and thus complete a circuit directly from the direct current supply bus DC+ to the lead DC'. The initial flow of current through the lead 30, the transformer coil 31, and the hall button relay HB in line 301 energizes the hall button relay which may be arranged to sound a signal or supply any other required indication that a hall button is being pressed.

After the motor relay contacts MR close and the hall call relay sealing contacts close the hall button relay HB is energized by current flow produced by the voltage generated in the transformer 31 as long as the hall button is held depressed.

FIGS. IV AND V

The circuits for selecting and starting the motor generator sets in response to an initial demand for service and further demands for service comprise a stepping switch or selector 515 having one deck 515G illustrated at line 405 in FIG. IV and having a second deck 515H illustrated at line 516 in FIG. V. A selector control relay 514 cooperates with the stepping switch to cause it to step from one position to another as it searches out the idle cars and selects such idle cars for starting. To provide, under certain conditions, a time interval between starting of the motor generator sets a timing relay 520, illustrated at line 510, is included to delay the stepping of the selector switch unless the then current demands for service require immediate selection and starting.

When the control supply lead CS is energized in response to an initial demand for service, a demand for service registered when all of the motor generator sets are shut down, current flows from the lead CS through normally closed contacts 514, shown in line 405, through a stepping switch common lead 35, and brush 36 to one of a series of selector contacts 37 and from the thus energized contact to an operating coil 519 of a motor generator set starting control relay 519, one for each car, shown in lines 401 to 404 inclusive. The starting control relays 519 have two coils, one for energizing and holding the relay energized and the other for neutralizing the first coil. The neutralizing coils, which are not illustrated, are connected in the circuits for shutting down the motor generator sets. When one of the starting relays 519 is energized it closes its contacts in lines 406, 408, 410 or 412, depending upon which of the relays is energized, to complete a holding circuit or sealing circuit to that particular relay.

The motor generator set starting relay 519 for any of the cars may also be energized directly from the control supply lead CS independently of the stepping selector switch whenever the door open button relay for that particular car is energized. These circuits include contacts DOB in lines 407, 409, 411, or 413 arranged in parallel with the sealing contacts for that relay.

Means are provided for starting additional motor generator sets under certain traffic conditions without waiting for selection or timing. These circuits, which are illustrated in lines 414 to 421 of FIG. IV, and include, in lines 414 to 417 inclusive, means for starting a second car whenever a car in service is at least 40% loaded, and there is but one car in service, contacts 471 are closed, or there is a certain up traffic demand that has been registered by an up traffic totalizer 535, or that there is an up call registered at the lobby floor to close contacts S1U. Under these circumstances the motor generator set of the next car in order is started. Thus, for example, if car A is the only car in operation and it becomes at least 40% loaded, the motor generator set of car B is immediately started. This is by way of the circuits shown in line 414 that permits current to flow from the control supply lead CS to the energizing coil 519b of the motor generator set starting control relay of car B. This circuit provides means for starting the cars as they are needed during the start of the up peak traffic demand as occurs at the beginning of a business day. Thus on the first up call registered by intending passengers a first car is put in service. If the traffic density is great enough so that that car is more than 40% loaded before it leaves the terminal floor it immediately starts the motor generator set of a second car. This car may then receive passengers and when it leaves the terminal floor there are two cars in operation thus opening the contacts 471 in line 414 and preventing the starting of an additional car until another call is registered at the terminal floor.

If the loaded cars have delivered their passengers so as to be less than 40% loaded by the time the later lobby call is registered no other car is started since those in service can quickly return to answer that call. However, if the traffic increases so that the last lobby call is registered before the other cars have unloaded, a third car and eventually a fourth car are brought into operation.

Means are also provided by the circuits shown in lines 418 to 421 so that each car if it becomes more than 80% loaded will start another car in the system other than the one next in immediate sequence. Thus if car A becomes 80% loaded as indicated by closure of its W4 contacts in line 418 it immediately energizes the operating coil of the third car start control relay 519c. Likewise, car B starts car D while cars C and D start cars A and B.

The shutting down of the motor generator sets when the demand decreases is initiated by motor generator shut down initiating relays 518 having coils shown in lines 407, 409, 411 and 413. Each shut down initiating relay is energized as long as its car is at the first floor so as to close its first floor contacts 1F, has its brake set to close its brake contacts B, has its door closed so as to close contacts DO and has no car call registered so as to close its no car call contacts CC. A timer is included in the shut down circuits so that these conditions must be maintained for a substantial time interval before the shut down occurs.

The circuits so far described provide means for indicating when a car may be shut down without interfering with the convenience of passengers and for starting the car in response to an initial demand for service or in response to certain degrees of loading in other cars then in operation.

For best overall service from a group of elevators it is desirable to start motor generator sets of idle cars in response to certain traffic conditions other than those already described. These circuits, shown in FIG. V, include means for advancing the stepping selector switch to select the next motor generator set to be started and for controlling the timing of the stepping of such selector switch. The timing means are responsive primarily to the demands for service as indicated by the presence of hall calls and the number of cars in operation.

The actual advancing of the selector switch 515 is controlled by circuits illustrated in lines 517 to 523 inclusive. When power is supplied to the control supply lead CS in response to an initial demand for service current flows from the lead CS through a lead 40, line 518, through normally closed contacts 41 of an actuator 42 of the stepping switch 515, lead 43, normally closed contact 514 of the stepping switch control relay 514, and the operating coil of the relay 515 to the return line 00. The operating coil of the stepping switch 515 thereupon draws the actuator mechanism 42 downwardly so as to engage the next tooth of a ratchet wheel 44 of the stepping switch. As soon as this actuator mechanism 42 is drawn downwardly it opens the contacts 41 to force the current to flow through a resistor 85, line 519, thus reducing the current flow through the operating coil of switch 515 to prevent damage to such coil should the circuit be maintained for an indefinite length of time. Ordinarily this circuit is only made momentarily and the operating coil is, therefore, designed for intermittent duty. When the actuator mechanism 42 is pulled downwardly it closes its contacts 45 so that current may flow from the lead 40 through a lead 47 and the coils of the selector control relay 514. This relay has a pair of coils as indicated in lines 521 and 522 one of which is connected to the lead 46 through a condenser C1. The coils are connected in opposition so that the charging current of the condenser flowing through the lower coil provides a slow pick-up and a slow drop-out of the relay. When the relay 514 operates at the end of a short time delay it opens its contacts in line 519 to deenergize the operating coil of the stepping selector switch 515. This releases the actuator mechanism so that its spring 48 then raises the actuator bar 42 which has engaged the next step on the ratchet wheel 44 and thus advances the stepping switch to the next position. A rectifier R1, shown in line 519, connected across the operating coil of the stepping switch 515 prevents any negative voltage surge as the circuit is broken and thus protects the contacts 514 from any damage from arcing.

Assuming that no motor generator sets are in operation when an initial demand for service is registered, the control supply lead CS is first energized by the circuits previously described and one motor generator set is started. Then, the stepping switch is advanced one position to select the next motor generator set to be started.

Without a further or increased demand for service the advance of the stepping selector switch 515 is limited to one step. Under the assumed conditions a timing relay 520, line 510, is deenergized so that its normally closed contacts 520, line 521, are closed to prepare a sealing circuit from the lead 47 to the supply lead CS that is completed through normally closed door interference relay contacts DT and position indicator relay contacts P1 that are closed as long as the car is in service. This sealing circuit maintains the selector control relay 514 and thus interrupts or prevents further stepping of the selector switch 515.

Occasionally a car in operation may be delayed by interference with its door reclosing operation. A common type of interference is the holding of the door by one passenger as he waits for a friend or stands in the door while completing a conversation with a passenger leaving at that floor. Regardless of the cause any interference with the door resulting in a delay from the normal reclosing time results in the opening of contacts DT for that particular car, as illustrated in lines 520 to 523. If all of the cars then in operation are so delayed the circuit to the stepping switch control relay 514 is broken permitting that relay to drop-out to close its contacts in line 405, to initiate the starting of the motor generator set of the next car in sequence, and at the same time close its contacts in line 519 to cock the stepping selector switch 515 for another step in its sequence of operations. As soon as the selector control relay 514 is energized at the end of the stepping operation it remains energized or is reenergized before its drop-out delay time has expired through the position indicator relay contacts P1 and door interference relay contacts DT of the last selected car.

The starting of another motor generator set and the corresponding stepping of the selector switch mechanism may also be initiated in response to the existence to certain demands for service over a predetermined time interval as determined by the timing relay 520 shown in line 510. When the timing relay times out and operates it opens its contacts in line 521 thereby deenergizing the selector control relay 514 in the same manner as operation of a door interference relay contact DT initiated a starting and stepping operation. The timing relay 520 is controlled by the circuits illustrated in lines 501 to 515 of FIG. V.

As long as at least one of the motor generator sets is shut down the closure of at least one of the normally closed contacts 519 of the various motor generator start control relays is closed to energize a lead 50. This lead supplies current through normally open contacts 514 of the selector control relay 514, line 510, to supply current to an operating coil 520 of the timing relay 520. The operating coil 520 is connected through a lead 51 to a plate 52 of a grid controlled gas discharge tube 53 the cathode 54 of which is connected directly to the return line 00. Normally a grid 55 of the cold cathode glow discharge tube 53 is held at a low enough potential so that no current flows through the tube. If, in response to certain traffic demands, the potential of the grid 55 is allowed to become approximately 50 to 60 volts positive with respect to its cathode 54 the gas in the tube is ionized and current flows from the lead 50 through contacts 514 when closed to the operating coil 520 of the timing relay and thence through the tube to the return lead. When the timing relay is energized by current flow through the gas discharge tube 53 it closes its contacts 520 at line 511 so as to place a resistor R44 in parallel with the tube. The resistor 44 by-passes the tube and by dropping the plate potential 52 below a critical voltage causes the tube to be deionized and the timing relay 520 is then held in by current flowing through its operating coil and the resistor R44. The timing relay 520 by opening its contacts 520 in line 521 deenergizes the selector control relay 514 to start another motor generator set and to initiate a stepping sequence of the selector relay 515.

The deenergization of the selector control relay 514, by opening its contacts in line 510, deenergizes the timing relay 520 provided a parallel circuit is not completed from lead 50 through contacts P1 of the car then selected but already in operation, contacts 57 of the stepping selector switch 515, through brush 58 and common conductor 59 to a lead 61 connected directly to the operating coil 520 of the timing relay 520. As long as the timing relay 520 is energized to open its contacts in line 521 the stepping selector relay 515 steps along at a speed determined by the pick-up and drop-out time of the selector control relay 514 until it finds a deenergized selector switch contact, corresponding to an idle car, thereby deenergizing the timing relay.

The timing interval before response by the timing relay 520 is controlled by the charging of a condenser C2, shown in line 508, one terminal of which is connected to the grounded lead 00 and the other terminal of which is connected through a resistor R45 to the grid 55 of the tube 53. The condenser C2 is initially discharged through a circuit including a lead 62 and normally closed contacts 514 of the selector control relay 514 and resistor 47. The resistor R47 is of fairly low resistance, its purpose being to limit the discharge current through the contacts of relays 514 or 520 employed to discharge the condenser C2 whenever the timing relay 520 is energized or the stepping selector control relay 514 is deenergized. For timing purposes the condenser C2 is charged through a resistor R46, line 508, from a lead 63 the potential of which is varied according to traffic conditions by means of an array of contacts shown in lines 504 to 509 and resistors R48 to R51 inclusive.

The lead 63 is connected to the junction point between resistors R50 and R51, line 504, which together form a voltage divider between a lead 64 and the return lead 00. The lead 64 is connected to the lead 50, which is connected to the control supply lead CS as long as at least one car is idle, whenever the traffic conditions or operating conditions require that the timing relay 520 be operated. This circuit from the lead 50 to the lead 64 is completed through the circuits shown in lines 501 and 502 as long as there is no car in service standing at the first floor. In this circuit the normally closed contacts 1F open whenever that car is located at the first floor and the corresponding in service contacts IS, line 502, open as long as the car is in service. Therefore, if the car or cars that are in service are away from the first floor the circuit is completed from the lead 50 to the lead 64 and voltage is applied to the divider comprising resistors R50 and R51. As long as the resistor R50 is not shunted a minimum voltage is applied to the lead 63 to give a maximum timing interval. This interval is preferably long enough for a car to make a round trip with one or two stops.

A next condition calling for energization of the lead 64 and eventual starting of additional motor generator sets is a failure of the power signal circuits which results in closure of the contacts SF, line 505, of a signal failure relay. Another condition is the lack of any cars in service and located at the first floor which is indicated by closure of relay contacts 550, line 506. A still further condition is that there are no cars in service which is indicated by closure of relay contacts 470, line 507. Additional conditions are the existence of at least a predetermined level or density of up or down traffic as indicated by the closure of down traffic relay contacts 536B, line 508, or up traffic totalizer relay contacts 535B, line 509.

It is desirable under certain conditions to decrease the time interval, in other words, accelerate the starting of a second motor generator set or succeeding motor generator sets. This acceleration of the timing is provided by inserting resistance in parallel with the resistor 50 or, for minimum time intervals, shorting the resistor 50 out of the circuit. A first step in decreasing the time interval is provided in the event there are three cars in operation, as indicated by closure of contacts 473, line 505, and there is either no car at the bottom terminal or one car at the terminal as indicated by closure of contacts 550 or 551 respectively in lines 506 and 505.

The timing interval may be accelerated also in the event that a hall call is registered, as indicated by closure of normally closed contacts 430 of a no hall call relay, and the condition that there are two cars in operation.

The timing interval is reduced to a minimum in the event that there are calls registered as indicated by closure of contacts 430 and there is no car in operation as indicated by closure of contacts 470, line 507. The timing interval is also reduced to a minimum in the event that the up or down traffic totalizing relays reach their third steps indicating a substantial amount of traffic and thus closing contacts 536C or 535C in lines 508 or 509 respectively.

In ordinary operation of the system the timing intervals are selected so that the maximum interval is long enough to permit a car to make a round trip and answer at least two calls. Thus, on intermittent or night service when the calls are few, the first car to have its motor generator set started in response to a call has time to answer that call and one more and return to the terminal floor before the discharge tube 53 becomes conducting to initiate the starting of another car. Thus, while the in service car is away from the terminal floor and answering calls the lead 64 is energized so that the condenser C2 is charging through the resistor R46. However, if the car returns properly, it does not acquire a sufficient voltage to cause the tube to discharge before the circuits in lines 501 or 502 are interrupted, thus deenergizing the lead 64 and permitting the condenser C2 to discharge through the resistors R46 and R51.

This circuit thus provides means for starting the motor generator sets of idle cars when the traffic demand is such that additional cars are required to serve the traffic and for preventing the starting of such additional cars in response to short time peak demands for service. This circuit, used in combination with means for shutting down each motor generator set when the services of the corresponding car are no longer required, provides a flexible traffic sensitive means for maintaining only enough cars in service to meet the traffic demands then existing.

A modified timing circuit for control of the stepping selector switch is illustrated in FIG. VI. This circuit performs substantially the same function as the circuit illustrated in FIG. V except that it does not employ a gas discharge tube in the timing circuit. In this circuit three relays, comprising a timing relay 520'; a selector control relay 514'; and an auxiliary control relay 515X, are employed to control a stepping selector switch 515'. When, in response to an initial demand for service, the lead CS' is energized, it by means of a circuit identical to that in FIG. IV, energizes the start control relay 519 of the selected car. It also energizes the timing relay 520' through normally closed contacts 515X and 514' (line 606) of the selector control relay 514' and auxiliary control relay 515X. The timing relay then closes its contacts 520' in line 602 to seal itself in pending certain demands for service. The timing relay 520' also closes its contacts 520' in line 607 to prepare a circuit to the coil of the auxiliary control relay 515X, and closes its contacts 520' in line 623 to complete a circuit through contacts 515X and resistor R85 to an operating coil of the selector control relay 514'. This operating coil is by-passed with a condenser C12, which, in cooperation with the resistor R85, provides a slow pick-up and drop-out of this relay 514'. When this relay 514' picks up it closes its contacts in line 608 to complete the circuit prepared by the timing relay contacts 520' to energize the auxiliary control relay 515X, and opens its contacts 514' in line 606 to break the energizing circuit to the timing relay 520'. It also opens its contacts 515X, line 623, so that the relay 514' is then energized through the motor control relay contacts MR of the now starting motor generator set. At this stage one motor generator set is starting and the circuit is prepared to respond to a further demand for service.

Such further demand for service may arise from interference with door reclosure of the car or cars in service or from increases in the traffic level. In either case the selector switch 515' is caused to advance to the next idle motor generator set and initiate the starting of that set. Assuming first the condition of door interference such that the door interference relays DT for the cars in service are opened. The opening of these contacts in lines 624-627 breaks the holding circuit for the slector control relay 514' to permit this relay to drop out. When this relay closes its normally closed contacts in line 618 actuating mechanism 42' of the stepping selector switch 515' is cocked by current flow through lead 40', contacts 41', lead 43', contacts 515X and 514', and the operating coil of the stepping switch. As the mechanism is cocked contacts 45' are closed to reenergize the selector control relay 514'. This relay thereupon opens it contacts 514', line 618, to deenergize the stepping switch operating coil and permit the stepping switch to advance to the next position. The opening of contacts 45', line 617, as the stepping switch advances drops out the selector control relay to close its contacts, as in FIG. IV, line 405, to start the next motor generator set. It also closes its normally closed contacts 514' in line 618 to initiate another step of the selector switch. As this step is completed the control relay 514' is held in by current flow through the motor relay contacts MR of the next selected and now starting motor generator set.

An array of contacts, shown in lines 601 to 605, and a pair of resistors R81 and R83 are arranged to maintain a current flow through the timing relay coil 520' according to traffic conditions and to break the circuit to the relay 520' when the traffic conditions require the starting of another motor generator set. When the current flow is interrupted a condenser C11 discharges through a resistor R82 and the relay coil 520' to hold the relay energized for the timing interval. If the condenser is charged to the full voltage between the supply lead CS' and the return lead 00 the time interval is in the order of 40 seconds.

When the timing relay 520' times out in response to a demand for service it opens its contacts 520' in line 623 to deenergize the selector control relay 514' and opens its contacts in line 607 to break a circuit to the coil 515X of the auxiliary selector relay 515X. If the then selected motor generator set is running the auxiliary relay 515X is held in by current flow through motor relay contacts MR, lines 609, 611, 613 or 615, selector contacts 57', brush 58', common conductor 59' and sealing contacts 515X. The drop out of the control relay 514' by closing its contacts in line 618 cocks the stepping switch for a stepping operation. The stepping continues until the brush 58' finds a dead contact thus dropping out the auxiliary relay 515X. As the selector control relay 514' drops out on the last step it closes its contacts to start the selected motor generator set, and by closing its contacts 514' in line 606 cooperates with contacts 515X to reenergize the timing relay 520'.

If the motor generator set then selected by the stepping selector is not running, the dropping out of the control relay 514' in response to the dropping out of the timing relay 520' initiates the starting of the then selected motor generator set, and, since the auxiliary relay 515X also drops out under this condition, conditions the circuit in line 606 to reenergize the timing relay 520' without stepping the selector.

The motor relay contacts MR may be on a relay that is operated only when the car is in service and available for answering calls. If the car should be assigned to special service it should not be selected as the next to be started. To avoid selecting a special service car, special service relay contacts SSRa, etc., lines 608, 610, 612 and 614, are arranged to energize corresponding selector contacts 57' so that the selector steps past these positions to the contacts for the next available car.

The timing relay 520' is held energized as long as there are no demands for additional cars to be started. A first such condition is that all the cars are in operation and accordingly the circuit through the starting control relay contacts 519 is completed in line 601. A second condition is the situation with one car in service on light traffic demands. In this condition the starting of a second car should be delayed until the first has had a reasonable time to answer the demand. With one car in operation contacts 471 in line 603 are open so the sealing circuit is through the circuit in line 602. This circuit includes signal failure contacts SF, no car in service contacts 470', no car at lower terminal contacts 550', second level traffic demand contacts 535D and 536D, and the balanced traffic relay contacts BAL and the sealing contacts 520'. As long as the in service car is at the terminal this circuit is closed. The circuit is broken at contacts 550' when the car answers a call. However, if the car returns to the terminal in time it reenergizes the timing relay to prevent a stepping operation. Should the car fail to return in time or should the traffic demand increase to open contacts 535D' or 536D' the timing relay, having been energized at full voltage, times out a full interval and then initiates a stepping operation of the selector to start another motor generator set.

If there are two cars in operation, and less than a certain level of traffic, and a hall call registered a circuit through R81 and R83 is completed to hold the timing relay 520' energized at a minimum level and thus prevent the starting of another car while both cars are away from the lower terminal unless the traffic demand increases to its third or higher level to open contacts 535E' or 536F'. If there are no hall calls registered and at least one car at the lower terminal the resistor R83 is shorted out to increase the level of excitation of the timing relay 520'. These various levels of excitation vary the response time of the timing relay 520' in response to increased traffic demand which opens contacts 535E' or 536F' of the traffic demand measuring relay system.

These circuits provide means for selecting and starting motor generator sets in accordance with the balance between the traffic demands and the number of cars in service and available to meet the demand.

Having described the invention, I claim:

1. In an automatic elevator system, in combination, a plurality of elevator cars adapted to serve a plurality of floors, hoisting means for moving said cars from floor to floor, signal means for registering demands for service, a motor generator set individual to the hoisting means for each car, means for selectively initiating the deenergization of the motor generator set of a car in accordance with a sustained lack of demand for service from that car, means responsive to a first level of traffic demand for starting a first motor generator set, and selecting means responsive to the operation of one car and to a second predetermined level of demand for service to be supplied by any car arranged to select a deenergized motor generator set and energize such set.

2. In an automatic elevator system, in combination, a plurality of elevator cars adapted to serve a plurality of floors, hoisting means for moving the cars from floor to floor, a motor generator set individual to the hoisting means for each car, signal means for registering demands for service, a motor generator selector mechanism, means responsive to an initial demand for service to start a first motor generator set, means responsive to a predetermined level of traffic demand indicated by said signal means and the operation of one car for actuating the selector mechanism to select an idle motor generator set, and means controlled by the selector mechanism adapted to start the selected motor generator set.

3. In an automatic elevator system, in combination, a plurality of elevator cars adapted to serve a plurality of floors, hoisting means for moving the cars from floor to floor, a motor generator set individual to the hoisting means for each car, signal means for registering demands for service, a selector mechanism, means responsive to an initial demand for service for immediately actuating the selector mechanism to select a first idle motor generator set and initiate starting of such set, and timing means responsive to additional demands for service and operation of one motor generator set for actuating said selector mechanism after a time delay to select another idle motor generator set and initiate starting thereof.

4. In an automatic elevator system, in combination, a plurality of elevator cars adapted to serve a plurality of floors, electrically actuated hoisting means for moving the cars from floor to floor, a motor generator set individual to the hoisting means for each car, said motor generator sets being deenergized in the absence of demands for service, signal means for registering demands for service, a selector mechanism, means responsive to an initial demand for service for immediately selecting and starting an idle motor generator set, time delay means responsive to an additional demand for service for selecting and starting an idle motor generator set, and means responsive to the magnitude of the load in the first selected elevator for starting the motor generator set of another elevator car.

5. In an automatic elevator system, in combination, a plurality of elevator cars adapted to serve a plurality of floors, electrically actuated hoisting means for moving the cars from floor to floor, a motor generator set for each hoisting means, signal means for registering demands for service, said motor generator sets being deenergized in the absence of demands for service, a selector mechanism, means responsive to an initial demand for service for immediately starting a selected motor generator set, means for indicating that one car is in operation, means responsive to the existence of a predetermined load in said one car, and circuits completed by said one car indicating means and said load indicating means arranged to initiate the starting of another motor generator set.

6. An automatic elevator system according to claim 5 having means responsive to a certain level of traffic, said means cooperating with said load determining means to complete circuits to initiate the starting of another motor generator set.

7. An automatic elevator system according to claim 5 having means for registering a call for service at a preselected floor, said means cooperating with said load determining means for completing circuits to initiate the starting of another car upon the existence of a predetermined load and a call for service from said preselected floor.

8. In an automatic elevator system, in combination, a plurality of elevator cars adapted to serve a plurality of floors, electrically actuated hoisting means for moving the cars from floor to floor, a motor generator set for each hoisting means, signal means for registering demands for service, said motor generator sets being deenergized in the absence of demands for service, a selector mechanism, means responsive to an initial demand for service for immediately starting the motor generator set of a selected car, timing mechanism adapted to advance said selector mechanism to start additional motor generator sets, and means responsive to certain predetermined elevator operating conditions for conditioning said timing mechanism for operation, whereby the existence of such conditions for such time interval initiates a selecting operation and starting of another motor generator set.

9. An automatic elevator system according to claim 8 having means for reducing the timing interval of the timing mechanism in response to the number of cars in service.

10. An automatic elevator system according to claim 8 having means indicative of predetermined levels of traffic demand arranged to accelerate the timing out of the timing mechanism.

11. In an automatic elevator system, in combination, a plurality of elevator cars adapted to serve a plurality of floors, electrically actuated hoisting mechanism for moving the cars from floor to floor, a motor generator set for each hoisting mechanism, signal means for registering demands for service, said motor generator sets being de-energized in the absence of demands for service, a selector mechanism adapted to select idle motor generator sets for starting, a timing mechanism adapted to initiate an operation of the selector to initiate the starting of another motor generator set, traffic sensing means, means responsive to the number of cars in operation, means responsive to the number of cars in service and standing at a preselected floor, and circuit means responsive to said means for initiating a timing operation of said timing mechanism in response to first predetermined conditions and for accelerating the timing interval in response to other predetermined conditions, said selector being arranged to initiate the starting of a motor generator set at the end of said timing interval.

12. In an automatic elevator system, in combination, a plurality of elevator cars adapted to serve a plurality of floors, electrically actuated hoisting mechanism for moving the cars from floor to floor, a motor generator set for each hoisting mechanism, signal means for registering demands for service, said motor generator sets being de-energized in the absence of demands for service, a selector mechanism adapted to select and initiate starting of an idle motor generator set, a timing mechanism adapted to initiate an operation of the selector mechanism, means responsive to first traffic demands for energizing said timing mechanism, means responsive to the number of cars in service arranged to accelerate the timing interval in predetermined amounts and means responsive to a second level of traffic demand adapted to produce a minimum timing interval of the timing mechanism.

13. An elevator system according to claim 12 in which the first traffic responsive means includes means responsive to the absence of operating cars at a preselected floor.

14. An elevator system according to claim 12 in which the first traffic responsive means includes means responsive to a predetermined level of traffic demand.

15. An elevator system according to claim 12 having means responsive to the existence of a call for service and two cars in operation for shortening the timing interval of the timing mechanism.

16. An elevator system according to claim 12 having means responsive to the condition of three cars in operation and less than two cars at the selected floor for shortening the timing interval of the timing mechanism.

17. An elevator system according to claim 11 having means responsive to the existence of a demand for service when no car is in service for decreasing the timing interval of the timing mechanism to a minimum.

References Cited in the file of this patent
UNITED STATES PATENTS

| | | |
|---|---|---|
| 2,100,726 | White | Nov. 30, 1937 |
| 2,581,245 | Eames | Jan. 1, 1952 |

UNITED STATES PATENT OFFICE
CERTIFICATE OF CORRECTION

Patent No. 3,026,971                  March 27, 1962

John R. Dinning

It is hereby certified that error appears in the above numbered patent requiring correction and that the said Letters Patent should read as corrected below.

Column 2, line 54, for "flors" read -- floors --; column 3, line 47, for "515*" read -- 515x --.

Signed and sealed this 15th day of January 1963.

(SEAL)
Attest:

ERNEST W. SWIDER
Attesting Officer

DAVID L. LADD
Commissioner of Patents